Nov. 16, 1954   H. MOHRLANG ET AL   2,694,499
FEED DISTRIBUTOR VEHICLE
Filed Sept. 14, 1951   3 Sheets-Sheet 1
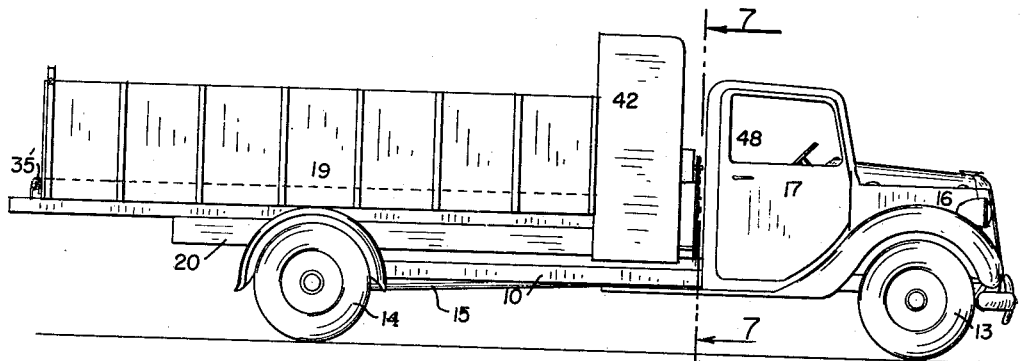
Fig. 1
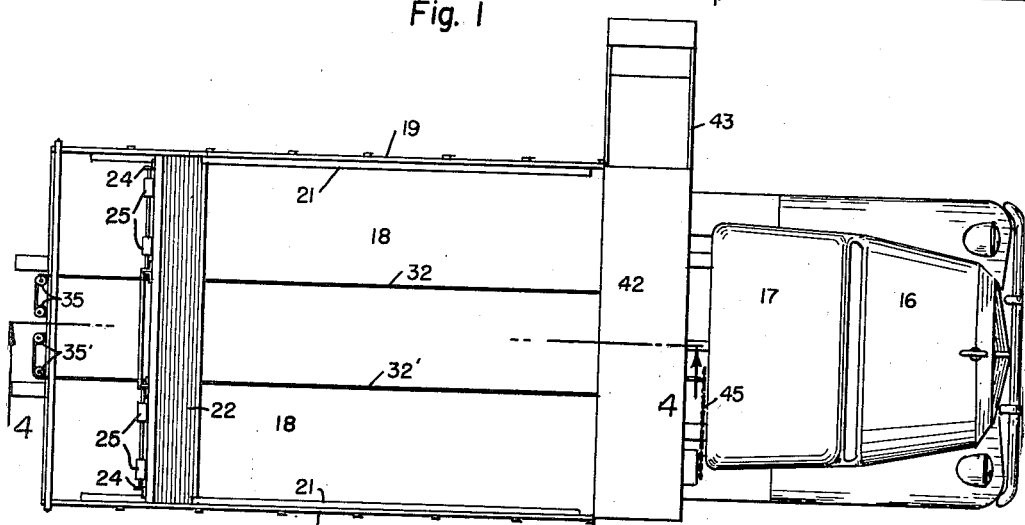
Fig. 2
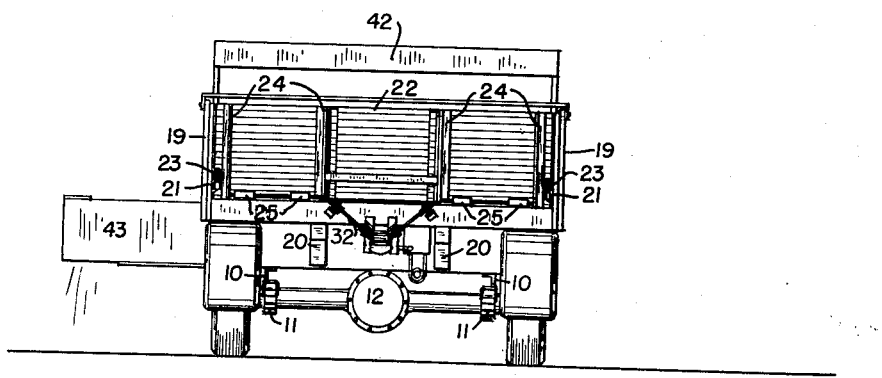
Fig. 3
*Inventor*
HARRY MOHRLANG
JACOB MOHRLANG JR.
*Attorney*

Inventor
HARRY MOHRLANG
JACOB MOHRLANG JR.

Nov. 16, 1954     H. MOHRLANG ET AL     2,694,499
FEED DISTRIBUTOR VEHICLE

Filed Sept. 14, 1951     3 Sheets-Sheet 3

Inventor
HARRY MOHRLING
JACOB MOHRLING JR.

By

Attorney

United States Patent Office 2,694,499
Patented Nov. 16, 1954

2,694,499
FEED DISTRIBUTOR VEHICLE

Harry Mohrlang and Jacob Mohrlang, Jr., near Brush, Colo.

Application September 14, 1951, Serial No. 246,636

1 Claim. (Cl. 214—518)

This invention relates to mobile, powered equipment for the expeditious transfer and delivery of stock food from the sites of storage or supply to the areas of actual consumption, and more particularly to such equipment as adapted for installation upon and use with motor truck vehicles of conventional design and construction, and has as an object to provide a novel and advantageous organization of elements constituting an open-top vehicle body arranged to receive and transport material and to deliver its charge in positions of desired availability at the will and under the control of the vehicle operator through the agency of means selectively powered by the vehicle engine.

A further object of the invention is to provide an improved truck bed or body arranged for the power delivery of its charge laterally and into bunks or troughs of the type commonly employed in the feeding of stock.

A further object of the invention is to provide an improved bed or body arranged for side delivery of its charge in mounted, powered association with a conventional truck and without occasion for alteration of the original chassis.

A further object of the invention is to provide an improved truck bed or body primarily adapted for the transfer and delivery of stock food that is simple and inexpensive of construction from commonly-available materials, that is positive and efficient in attainment of the ends for which designed, that is widely adaptable in specific use, and readily conformable to operative association with various makes and types of trucks.

With the foregoing and other objects in view, our invention consists in the construction, arrangement, and combination of elements as hereinafter set forth, pointed out in our claim, and illustrated by the accompanying drawings, in which—

Figure 4:
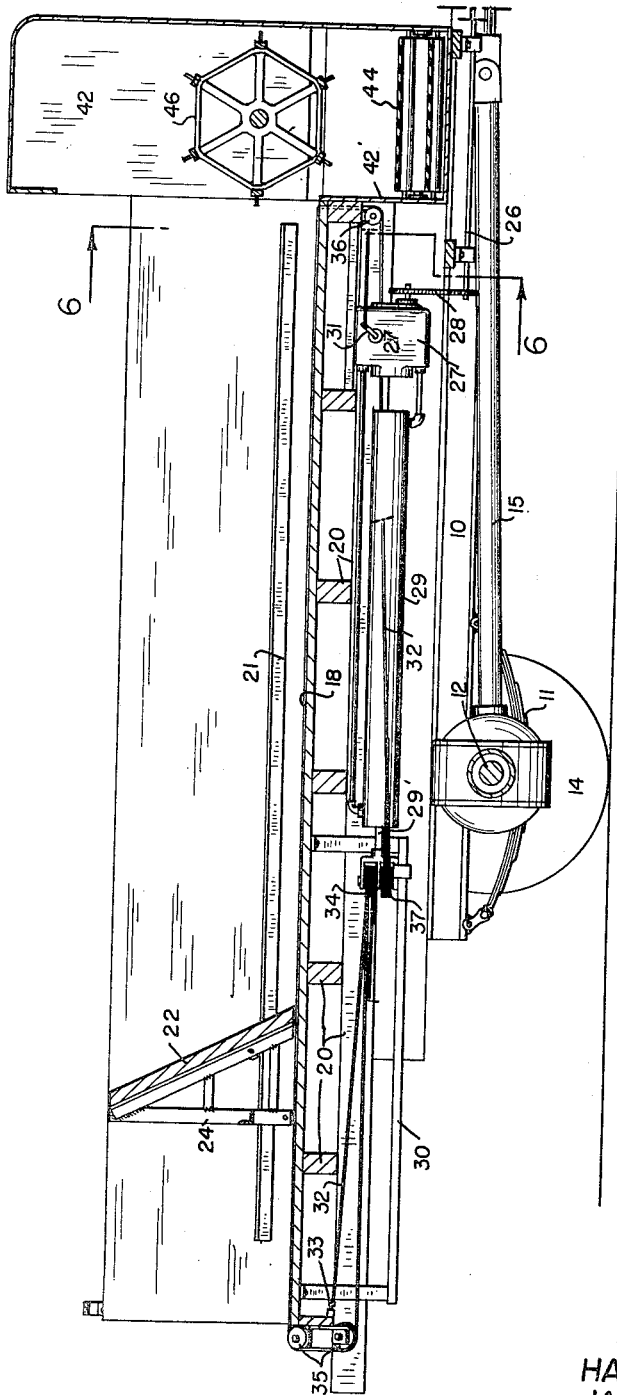
Figure 5:
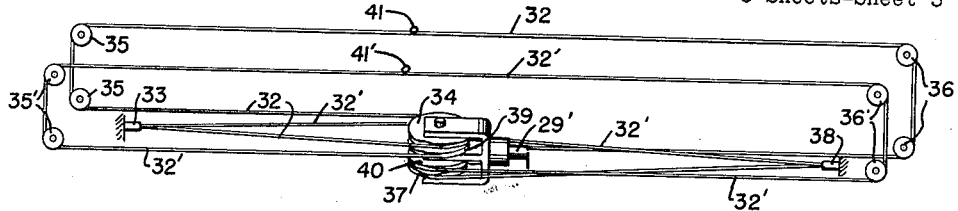
Figure 6:
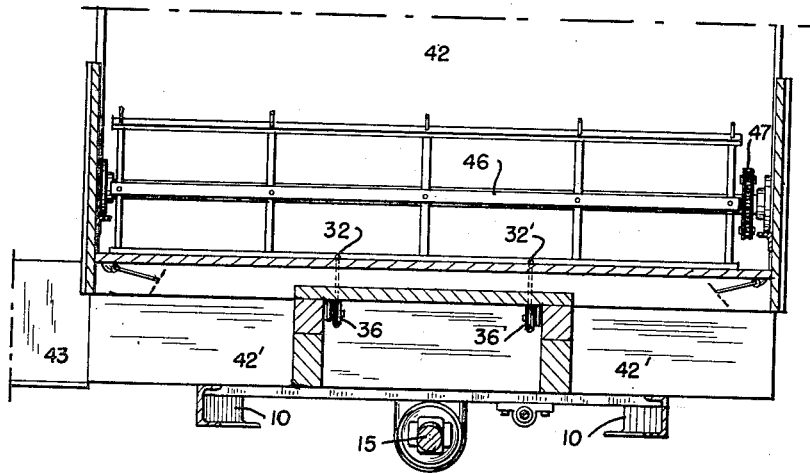
Figure 7:
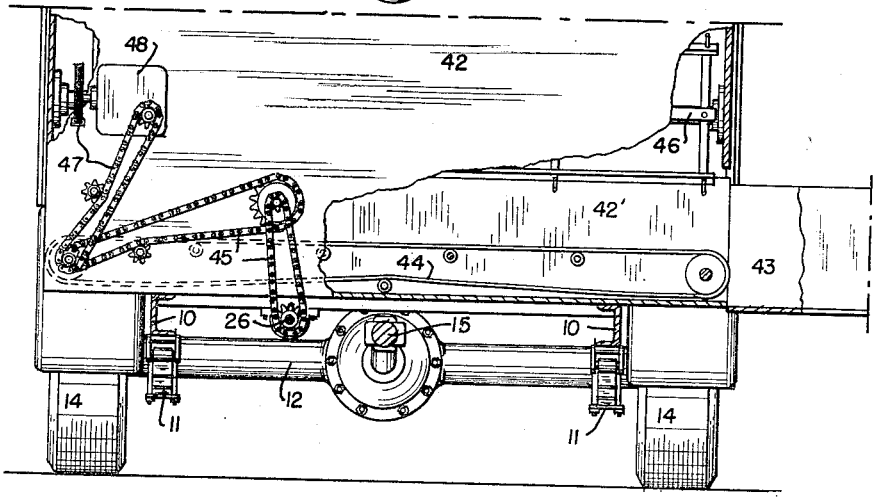

Figure 1 is a side elevation of a typical embodiment of the invention as truck-mounted ready for practical use. Figure 2 is a plan view of the organization according to Figure 1. Figure 3 is a rear end elevation of the arrangement according to the preceding views. Figure 4 is a longitudinal section, on an enlarged scale, taken substantially on the indicated line 4—4 of Figure 2. Figure 5 is a diagrammatic view of certain powered connections advantageously employed in the organization as shown. Figure 6 is a cross section, with portions broken away to conserve space, taken substantially on the indicated line 6—6 of Figure 4. Figure 7 is a cross section, on the same scale as Figures 4 and 6 and with portions broken away to conserve space and to better illustrate otherwise concealed construction, taken substantially on the indicated line 7—7 of Figure 1.

It is a common practice of stock feeders to store the stock food, such as grain, ensilage, meal, and the like, in suitable facilities at some distance from the lots, pens, and pastures where the livestock feed, and to transport the food to the stock as needed. Further, considerations of efficiency and economy have developed the practice of charging the food into troughs and bunks, usually arranged as an aligned series of considerable length, where it is fairly available to the stock with less waste than when windrowed or scattered upon the ground, hence the routine of stock feeding has come to involve not only the labor of loading and transporting the food but the additional labor of distributing the load to the bunks and troughs, and it is to the provision of facilities for accomplishing such routine with dispatch and a minimum of labor that the instant invention is directed.

In the drawings a typical automotive truck, of any usual type, make, and construction, is conventionally represented as having the customary rigid frame 10 supported through the agency of springs 11 and a rear drive axle 12 by dirigible front wheels 13 and rear drive wheels 14 to which power is applied through a drive shaft 15 and the axle 12 from an engine carried at the forward end of the frame within a hood 16, all of which is arranged for control by an operator riding in a cab 17 fixed to the frame just rearwardly of the hood 16, thus to expose the major rearward length of the frame 10 for the reception of a bed or body of the particular type and characteristics desired.

Giving effect to the principles of the invention, an open-top, open-end bed is constituted in any appropriate size and specific construction as a smooth, imperforate floor 18 rigidly engaged at each of its long margins with spacedly-parallel, perpendicularly-upstanding side panels 19 of desired height. The so-constituted bed is superposed on and secured to the frame 10, as through the agency of blocks and stringers 20, in such length and width as may be deemed to be appropriate, and with the bed forward end spaced rearwardly from the cab 17, for purposes which will appear hereinafter.

Along the inner faces of the panels 19, parallel to and somewhat above the upper surface of the floor 18, straight, smooth tracks, such as lengths of angle iron 21, are affixed as guides and supports for a movable end gate 22. The end gate 22 has the function of shifting the charge within the bed forwardly along the floor 18 and between the side panels 19, for which purpose it is expedient to form the end gate as a solid panel sized to bridge transversely of the bed and close between the side panels 19 and to at least equal the side panel depth, thus to close at its lower margin against the floor 18, when disposed at an inclination to the vertical with its lower edge advanced toward the cab 17 more closely than its upper edge, such inclination of the end gate panel facilitating its action in moving the bed charge. Side margins of the end gate panel are notched to slidably accommodate the rails 21 and suitable rollers 23 are mounted on the end gate panel rear face in position to ride on said rails for obvious translatory advantage, and struts 24 desirably bracing the end gate panel rear face mount rollers 25 between their rearward lower ends in engagement with the floor 18 upper surface, thereby to condition the end gate 22 for guided travel longitudinally of the bed with a minimum of friction.

Shift of the end gate 22 in either direction of its travel along the bed is a function under the control of the vehicle operator through the agency of means powered by a "take-off" shaft such as is, together with its operative controls, standard equipment available with and on conventional trucks, and such a "take-off" shaft, or a synchronously-driven extension thereof, is represented at 26 as journaled for rotation longitudinally and beneath the forward end of the bed floor 18, it being understood that said shaft element 26 is power-rotatable by the engine of the truck at the will of the operator and independently of the truck travel. An hydraulic pressure pump unit 27, of conventional type and construction, is fixedly mounted beneath the bed floor 18 in driven relation, as at 28, with the shaft element 26, and an hydraulic ram 29 is mounted longitudinally and beneath the bed floor 18 rearwardly adjacent the pump unit 27 with its extensible element 29' directed rearwardly of the assembly for reciprocation along guides 30 depending from said bed floor. The cylinder of the ram 29 is served by and from the pump unit 27 in the customary manner and said pump unit includes a valve 31 selectively positionable by the operator to determine the direction of fluid pressure flow from said unit to the ram cylinder and the consequent direction of ram extensible element 29' travel, so that through suitable manipulation of controls available to him in the cab 17 the operator may apply truck engine power through the shaft element 26, pump unit 27, valve 31, and ram 29 to extend or retract the ram element 29', all in a conventional and well-understood manner. Extension and retraction of the ram element 29' is applied to effect reciprocation of the end gate 22 longitudinally of the bed wherein it is mounted through the agency of a cable arrangement most clearly shown in Figure 5. The free end of the ram element 29' mounts four like pulleys freely rotatable about a common axis on and movable with said element free end, and two like cables operatively engage said pulleys with identical effect, whereby to engage the end gate 22 at two points to obviate twisting and binding thereof during its translatory travel. In the arrangement shown, a cable 32 is fixed at one end to a rearward member of the bed assembly, as at 33, and extends forwardly thence to and about the uppermost pulley 34 of the set carried by the ram element 29′ whence it is returned rearwardly of the assembly to pass about guide pulleys 35 at the rear end of the bed floor 18, and to one side of the longitudinal center line thereof, whereby said cable 32 is directed to pass forwardly along, longitudinally of, and just above said bed floor to the forward end thereof where it is led about a second set of guide pulleys 36, similar to the pulleys 35, and thereby returned rearwardly of and beneath the bed floor 18 to engagement with and about the lowermost pulley 37 of the set carried by the ram element 29′ whereby it is again directed forwardly and to attachment of its end to a forward member of the bed assembly, as at 38. Thus, the ends of the cable 32 being fixed to opposite ends of the bed assembly and a double bight of said cable being simultaneously and oppositely engaged by the pulleys movable with the ram element 29′, extension of said ram element rearwardly of the bed assembly operates to shift the run of the cable lying along and above the bed floor forwardly of said floor at a speed and for a distance twice the speed and distance of the ram element travel. Similarly, and with identical effect, a second cable 32′ is end secured at 33 and 38, passes about guide pulleys 35′ and 36′, and operatively engages the second and third pulleys of the ram element set, 39 and 40, respectively, to position its intermediate reach along and above the bed floor 18 in spaced parallelism with the similar reach of the cable 32 and at the other side of the bed floor center line, the said intermediate reaches of the cables 32 and 32′ moving synchronously and in the same direction in reaction to ram element 29′ travel, and the linkage of said cables with said ram element operating to reflect ram element travel in either direction as simultaneous and oppositely-directed cable reach travel. With the cable arrangement shown, the lower margin of the end gate 22 is adjustably secured, as by means of clamps, to like and suitable points of the cable 32 and 32′ intermediate reaches, as, for example, at 41 and 41′ of Figure 5, whereby to reflect travel of said cable intermediate reaches as corresponding travel of the end gate.

Closing transversely across the otherwise open forward end of the bed constituted as shown and described, a housing 42 is fixed in the space between said bed forward end and the cab 17 to upstand above and extend below said bed with its end members in coplanar registration with and secured to the bed side panels 19, the forward side, top, and bottom of said housing being closed and the rearward side of the housing being open in registration with the open forward end of the bed to freely receive the bed charge as the latter is translated forwardly along the bed in reaction to end gate shift therein. The lower end of the housing 42 is constituted as a depressed, substantially-horizontal trough 42′ laterally of the bed forward end and below the bed floor 18, said trough opening at one end through an end member of the housing 42, and a delivery chute 43 is fixed to extend laterally of and beyond the truck and bed assembly in end registration with and as a continuation of the trough 42′ where the latter intersects the housing end member, the outer end of said chute being open and the chute floor preferably being foreshortened relative to its side walls. The trough 42′ operatively accommodates an endless conveyor 44, of any suitable type and construction, therein mounted for travel of its upper run laterally of and somewhat below the forward end of the bed floor 18 in a direction away from the unintersected end member of the housing 42 and toward the end of the chute 43 registered with the opening in the other housing end member, and an appropriate drive, such as a chain and sprocket arrangement 45, operatively links one of the conveyor-mounting end rollers with the shaft element 26 in a manner to drive said conveyor at suitable speed whenever said shaft element 26 is powered. Completing the assembly, a reel-type beater 46 is mounted for rotation in the housing 42 above the conveyor 44 and about an axis journaled to the housing end members above and parallel to the plane of the bed floor 18 and a drive 47 through a gear box 48 operatively links said beater with the shaft element 26, conveniently through the drive 45, to rotate the beater in an appropriate direction, preferably counter to the direction of truck wheel rotation during forward travel of the truck, whenever said shaft element is powered.

Constructed, mounted, and powered as shown and described, the improvement is conveniently and advantageously operable for the transfer of stock foods of various types from storage and to delivery at the feeding site. With the end gate 22 retracted to the rear end of the bed and said bed charged with a load of the stock food, the truck is driven to the feeding site and directed along a travel path paralleling the feed troughs or bunks to dispose the free end of the delivery chute 43 for discharge into said troughs or bunks, whereupon the shaft element 26 is powered to drive the pump unit 27, conveyor 44, and beater 46, and the valve 31 is positioned for gradual extension of the ram element 29′, so that as the truck moves along the line of feed troughs or bunks in the relationship specified the end gate 22 is gradually advanced along the bed to correspondingly advance the feed charge therein and to deposit upon the conveyor 44, the said conveyor functions to move its charge of feed laterally of the bed forward end to the delivery chute 43 which guides and directs the ultimate feed discharge, and the beater 46 functions to agitate and rake through the advancing feed charge of the bed for uniform and unimpeded distribution of the feed material to the conveyor. While it is manifest that the improvement is particularly adapted for the delivery of feed to troughs and bunks, it is readily apparent that the arrangement is equally applicable to the windrowing of feed upon the ground, in which operation the improved facilities function with economy, efficiency, and conservation of labor.

Since changes, variations, and modifications in the form, construction, and arrangement of the elements shown and described may be had without departing from the spirit of our invention, we wish to be understood as being limited solely by the scope of the appended claim, rather than by any details of the illustrative showing and foregoing description.

We claim as our invention:

A livestock feed distributor, comprising the combination with an automotive truck having a selectively-engageable power take-off element, of an open bed formed with an imperforate fixed floor, an end gate shiftable longitudinally of said bed along and above said floor, means in driven relation with said take-off element selectively operable to shift said end gate in either direction along the bed, a housing transversely closing the forward end of said bed, a floored trough in the lower end of said housing laterally of and below the bed, a delivery chute projecting laterally of the bed in registration with and as an extension of said trough, a conveyor in and operable longitudinally and above the floor of said trough for delivery to said chute, a drive operatively connecting said conveyor with said take-off element, a beater rotatable in said housing about an axis spacedly paralleling and above said conveyor, and an extension of the drive to said conveyor operatively serving to rotate said beater, wherein the means in driven relation with said take-off element operable to shift said end gate include a pressure pump unit in constant-driven relation with the take-off element, an hydraulic ram served by said pump unit, valve means in said pump unit selectively positionable to control the flow of pressure to said ram, and cables operatively connecting between said end gate and the extensible element of said ram, whereby to reflect extension and retraction of said ram element as oppositely-directed shift of said end gate.

References Cited in the file of this patent

UNITED STATES PATENTS

| Number | Name | Date |
|---|---|---|
| 773,332 | Merrell | Oct. 25, 1904 |
| 1,256,196 | Beisner | Feb. 12, 1918 |
| 1,471,302 | Wright et al. | Oct. 16, 1923 |
| 2,318,886 | Paiement | May 11, 1943 |
| 2,408,284 | Anthony | Sept. 24, 1946 |
| 2,478,228 | Benson | Aug. 9, 1949 |
| 2,503,129 | Pautz | Apr. 4, 1950 |
| 2,541,538 | Newell | Feb. 13, 1951 |
| 2,557,003 | Le Laurin | June 12, 1951 |
| 2,569,161 | Golay | Sept. 25, 1951 |
| 2,601,618 | Kringle | June 24, 1952 |